United States Patent
Morishita

(10) Patent No.: US 7,034,839 B2
(45) Date of Patent: Apr. 25, 2006

(54) IMAGE DISPLAY SYSTEM SCROLLING IMAGE AT HIGH SPEED USING DATA COMPRESSION

(75) Inventor: Yoji Morishita, Kariya (JP)

(73) Assignee: Denso Corporation, Kariya (JP)

( * ) Notice: Subject to any disclaimer, the term of this patent is extended or adjusted under 35 U.S.C. 154(b) by 310 days.

(21) Appl. No.: 10/437,071

(22) Filed: May 14, 2003

(65) Prior Publication Data
US 2004/0008183 A1 Jan. 15, 2004

(30) Foreign Application Priority Data
Jul. 15, 2002 (JP) .................................. 2002-205492

(51) Int. Cl.
*G06T 9/00* (2006.01)

(52) U.S. Cl. .................. 345/555; 345/536; 345/503; 345/531; 382/113; 382/232; 382/254; 701/23; 701/28; 701/200; 715/784; 340/995.1; 340/995.14; 340/995.15; 340/995.18

(58) Field of Classification Search ............. 345/503, 345/520, 522, 530, 531, 536, 555; 382/113, 382/232, 254; 701/23–25, 28, 200, 212; 715/784; 340/995.1, 995.14, 995.15, 995.18
See application file for complete search history.

(56) References Cited

U.S. PATENT DOCUMENTS

| 5,351,133 | A |   | 9/1994  | Blonstein |
|-----------|---|---|---------|-----------|
| 5,841,936 | A | * | 11/1998 | Kobayashi .................. 386/33 |
| 5,845,226 | A |   | 12/1998 | Ajima |
| 6,073,075 | A | * | 6/2000  | Kondou et al. ............. 701/203 |
| 6,081,609 | A | * | 6/2000  | Narioka ...................... 382/113 |
| 6,366,287 | B1 | * | 4/2002 | Van Vugt .................... 345/503 |
| 2001/0028470 | A1 | * | 10/2001 | Tuli ............................. 358/1.9 |
| 2002/0030844 | A1 | * | 3/2002 | Tuli ............................ 358/1.15 |
| 2002/0070934 | A1 | * | 6/2002 | Sakamoto et al. .......... 345/419 |
| 2003/0146985 | A1 | * | 8/2003 | Miyagi et al. ............ 348/231.3 |
| 2004/0030493 | A1 | * | 2/2004 | Pechatnikov et al. ....... 701/208 |
| 2004/0204829 | A1 | * | 10/2004 | Endo et al. ................. 701/202 |

FOREIGN PATENT DOCUMENTS

| EP | 0 933 694 A1 | 7/1998 |
| JP | A-H10-161637 | 6/1998 |
| JP | A-H11-161158 | 6/1999 |
| JP | A-2000-148126 | 5/2000 |

* cited by examiner

*Primary Examiner*—Ulka J. Chauhan
(74) *Attorney, Agent, or Firm*—Posz Law Group, PLC

(57) ABSTRACT

When a user pushes a scroll-direction key, an ECU obtains, from a memory, a division map corresponding to a division located in a direction designated by the scroll-direction key. The ECU then outputs the division map to a display controller. The display controller compresses the division map to store in a VRAM. At scrolling a displayed image, the display controller expands the compressed division map. It then outputs, to an image signal generator, only a necessary portion of the expanded division map. Thereby, the displayed image can be scrolled at high speed and easily recognizable for the user.

9 Claims, 10 Drawing Sheets

IMAGE DISPLAY SYSTEM SCROLLING IMAGE AT HIGH SPEED USING DATA COMPRESSION

CROSS REFERENCE TO RELATED APPLICATIONS

This application is based on and incorporates herein by reference Japanese Patent Application No. 2002-205492 filed on Jul. 15, 2002.

FIELD OF THE INVENTION

The present invention relates to an image display system scrolling an image at high speed by utilizing data compression.

BACKGROUND OF THE INVENTION

A method of scrolling an image (image-scrolling) at high speed is disclosed in JP-A-H11-161158. In this method, resolution of a displayed image at scrolling is decreased to one half to realize high-speed scrolling. Namely, when original map data shown in the upper portion of FIG. 13 are used for image-scrolling, scrolling map data are generated by thinning the original map data vertically and horizontally every other line as shown in the lower portion of FIG. 13. While the resolution of the scrolling map data is a half of the resolution of the original map data, a data amount of the scrolling map data is one fourth of that of the original map data. The generated scrolling map data are stored in a VRAM.

From the stored scrolling map data, each portion corresponding to a map image necessary for the image-scrolling is sequentially retrieved and displayed on a display. This results in realizing the image-scrolling at a quadruple speed of a speed at which images corresponding to the original map data are scrolled.

In recent years, a high-definition map image becomes available, and a data amount of the map image has been thereby increasing. If the high-definition map image is used for image-scrolling, the data amount of the map image is required to be much more thinned. In this case, the resolution of a scrolling image must be significantly decreased, so that the scrolling image becomes much less recognizable.

The above problem is remarkably exhibited in a car navigation system that has an image-scrolling function. The car navigation system typically has a low memory amount of VRAM due to cost restriction, while the system is required to display high-speed and recognizable scrolling image.

SUMMARY OF THE INVENTION

It is an object of the present invention to provide an image display system that scrolls a displayed image at high speed with maintaining resolution of the displayed image.

To achieve the above object, an image display system is provided with the following. When start of scrolling a displayed image is commanded, a given portion of image data is retrieved. Here, the given portion of the image data includes the image data that are to be displayed at scrolling. The given portion is then compressed to generate compressed data. The compressed data are expanded to generate expanded data. By using the expanded data, the displayed image is scrolled. This structure enables the image data to be displayed at scrolling at high speed without decreasing resolution of the image data. This results in maintaining a recognizable displayed image even at scrolling.

It is preferable that the image data are compressed by substituting another piece of color information for a certain piece of the color information of a certain pixel included in the image data. This structure enables a data amount of the image data to be effectively decreased. This results in realizing high speed at scrolling.

BRIEF DESCRIPTION OF THE DRAWINGS

The above and other objects, features and advantages of the present invention will become more apparent from the following detailed description made with reference to the accompanying drawings. In the drawings.

Figure 1:
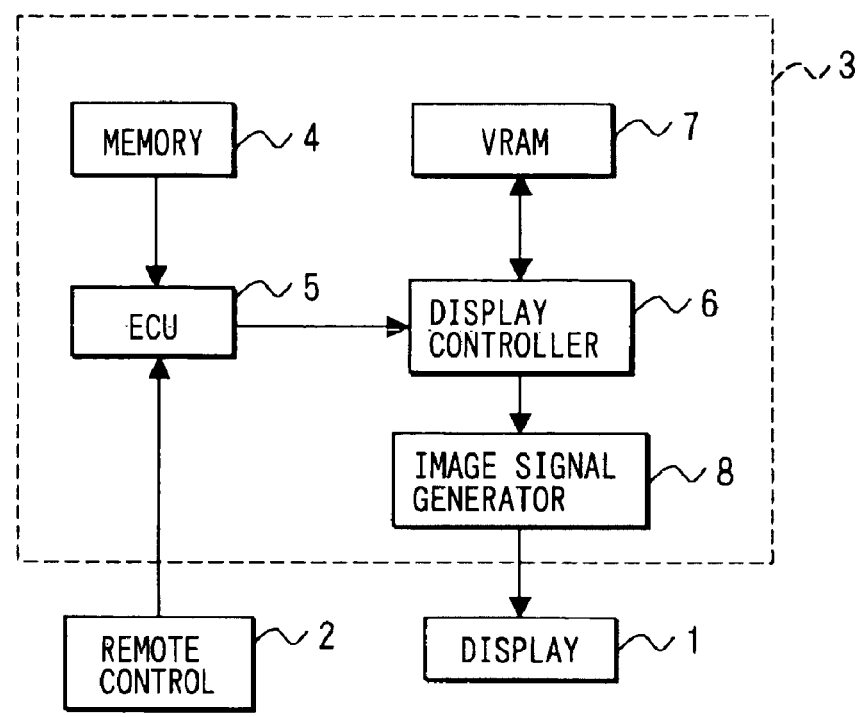
FIG. 1 is a schematic block diagram showing overall structure according to a first embodiment of the present invention.

DETAILED DESCRIPTION OF THE PREFERRED EMBODIMENTS (First Embodiment)

An image display system of a first embodiment of the present invention is mounted in a car navigation system 3 and capable of displaying a map image by scrolling. A display 1 is, for instance, an in-vehicle liquid crystal display, and executes stationary displaying and scroll displaying. An in-vehicle head-up display that displays an image on a windshield of a vehicle can be used for as the display 1.

A remote control 2 is multi-functional and equipped with scroll-direction keys. A user can start to scroll the map image towards a certain direction by pushing the scroll-direction key. This operation can be inputted also through a touch panel display integrated in the display 1 or a compact keyboard such as a pocket board.

The car navigation system 3 includes a memory 4, an ECU 5, a display controller 6, a VRAM 7, and an image signal generator 8. The image signal generator 8 generates, from map data or expanded data, image signals for executing the stationary displaying or scrolling display of the map image on the display 1 to output to the display 1. The memory 4 is, for instance, formed of nonvolatile memory elements such as flash memory, and stores the map data as image data. The map data are formed of division map data corresponding to respective latticed divisions into which the map image is divided every a certain distance in an east-west and a north-south direction. The map data are stored and read in and from storage such as a CD-ROM, or a DVD-ROM. The map data can be stored as a common bit-map format or a vector format that describes an image by combination of coordinates and a formula.

The VRAM 7 is, for instance, formed of memory elements such as a DRAM, and generally stores the division map data for the map image that is shown on the display 1. At the scroll displaying, the VRAM 7 stores, as compressed data compressed every a division, division map data of the map image that is to be displayed at scrolling.

The ECU 5 is an ECU for navigation, and generally obtains a plurality of division map data, including the map image to be displayed on the display 1, from the memory 4 to output to the display controller 6. As the user pushes the scroll-direction key of the remote control 2 to command starting to scroll, the ECU 5 obtains adjacent division map data from the memory 4 to output to the display controller 6. The adjacent division map data correspond to divisions that adjoin, externally towards a direction designated by the scroll-direction key, divisions that are displayed on the display 1.

The display controller 6 obtains the division map data that the ECU 5 obtained from the memory 4, to make the VRAM 7 store them. The display controller 6 then reads out the stored division map data from the VRAM 7 to output to the image signal generator 8.

By contrast, when the user commands starting to scroll by pushing the scroll-direction key, the display controller 6 reads the division map data stored in the VRAM 7 to compress and again store in the VRAM 7. Furthermore, it obtains from the ECU 5 division map data necessary for scrolling, to compress and then store in the VRAM 7. The compressed data are then expanded and outputted to the image signal generator 8.

Figure 2:
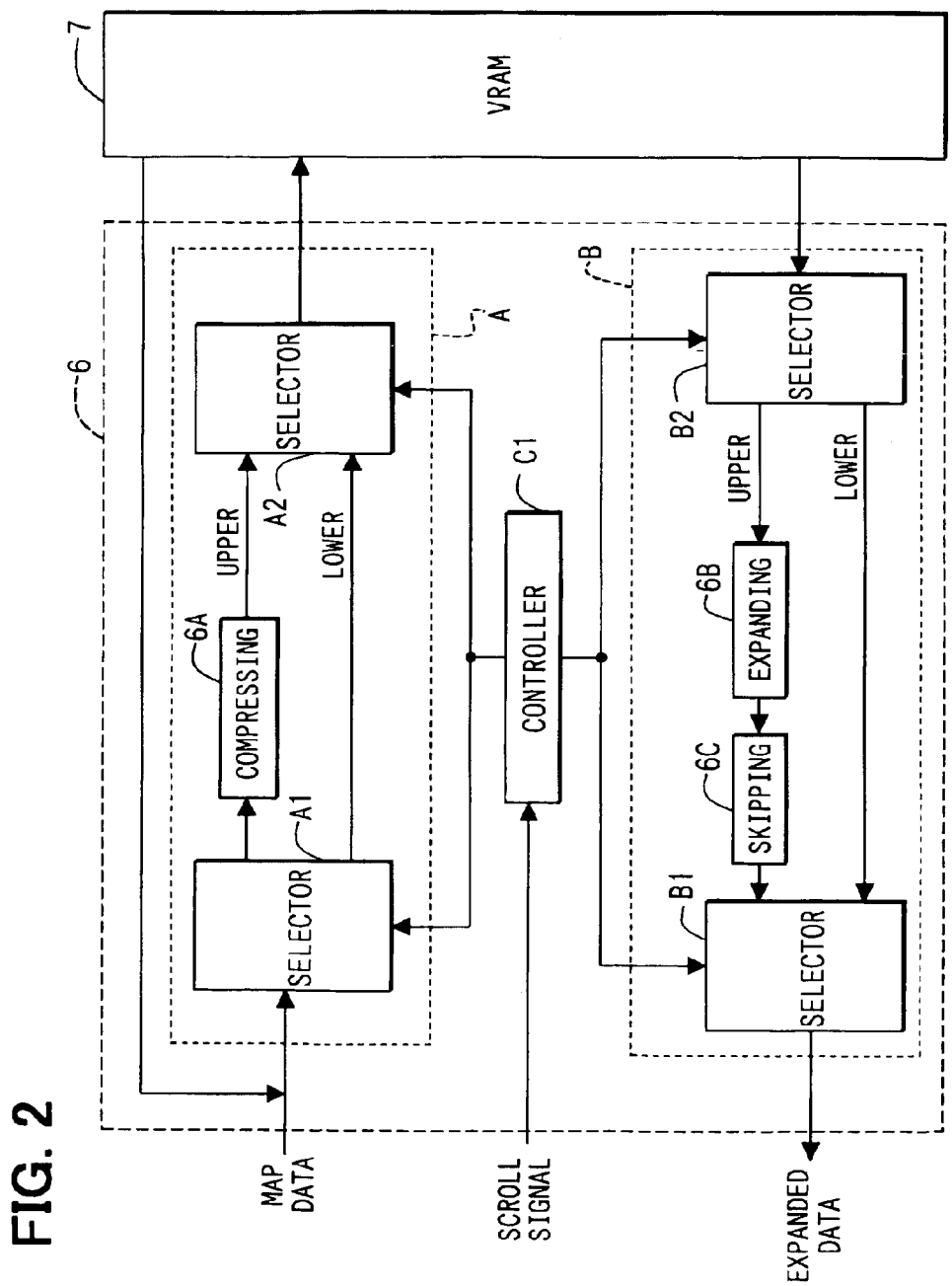
FIG. 2 is a schematic block diagram showing structure of a display controller according to the first embodiment.

As shown in FIG. 2, the display controller 6 includes a compressing section A, an expanding section B, and a controller C1. The compressing section A includes a compressing unit 6A, a selector A1, and a selector A2. The compressing unit 6A codes the division map data stored in the VRAM 7 by a run-length encoding method to (reversibly) compress.

The division map data read from the memory 4 are generally directly outputted to the VRAM 7 through a lower connection line between the selector A1 and selector A2. At the scroll displaying, the above division map data read from the memory 4 are differently treated as follows: they are directly once stored in the VRAM 7 through the lower connection line between the selectors A1 and A2; they are then inputted to the selector A1; they are inputted to the compressing unit 6A through an upper connection line between the selectors A1 and A2 to generate compressed data; and the generated compressed data are outputted to the VRAM 7. Namely, with switching the connection lines between the selectors A1 and A2, the display controller 6 inputs the division map data from the memory 4 and compresses the division map data read from the VRAM 7.

The expanding section B includes an expanding unit 6B, a skipping unit 6C, a selector B1, and selector B2.

The expanding unit 6B expands the compressed data stored in the VRAM 7 to generate expanded data.

Figure 3:
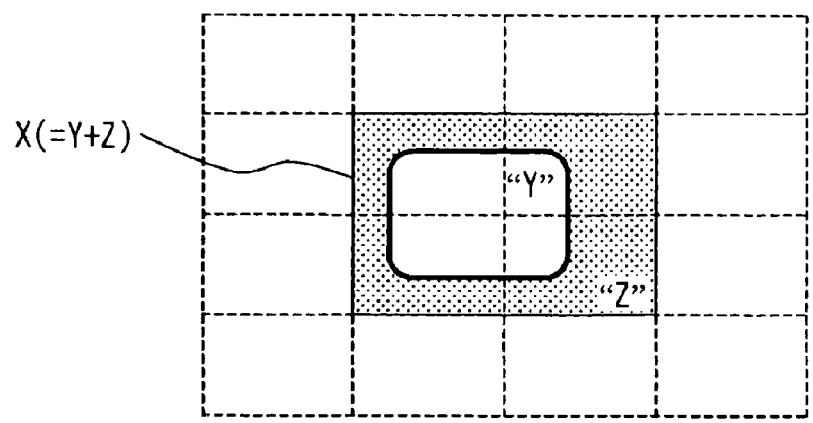
FIG. 3 is a view showing a necessary and an unnecessary area of expanded data for scrolling.

The skipping unit 6C skips unnecessary portion for the scroll displaying to output an only necessary portion to the image signal generator 8. In detail, as shown in FIG. 3, at the scroll displaying, the expanding unit 6B expands a plurality of groups of compressed data corresponding to four division maps of "X(=Y+Z)," and the skipping unit 6c outputs the necessary portion corresponding to "Y" by skipping the unnecessary portion corresponding to "Z(dotted area)."

The division map data read from the VRAM 7 are generally directly outputted to the image signal generator 8 through a lower connection line between the selectors B1 and B2. By contrast, at the scroll displaying, the above division map data read from the VRAM 7 are inputted to the expanding unit 6B through a switched upper connection line between the selectors B1 and B2. The expanded data in the expanding unit 6A are then skipped in the skipping unit 6C, and the only necessary portion for the scroll displaying is outputted to the image signal generator 8.

The controller C1 controls switching of the selectors A1, A2, B1, and B2, as explained above. The two lower connection lines between the selectors A1 and A2 and between the selectors B1 and B2 are generally used. When a scroll signal is inputted from the ECU 5, the controller C1 starts to switch the connection lines. The selectors A1 and A2 are connected through the lower connection line when the division map data are read from the memory 4 and through the upper connection line when the division map data read from the VRAM 7 are compressed. When the scroll signal is inputted, the selectors B1 and B2 are connected through the upper connection line.

Figure 4:
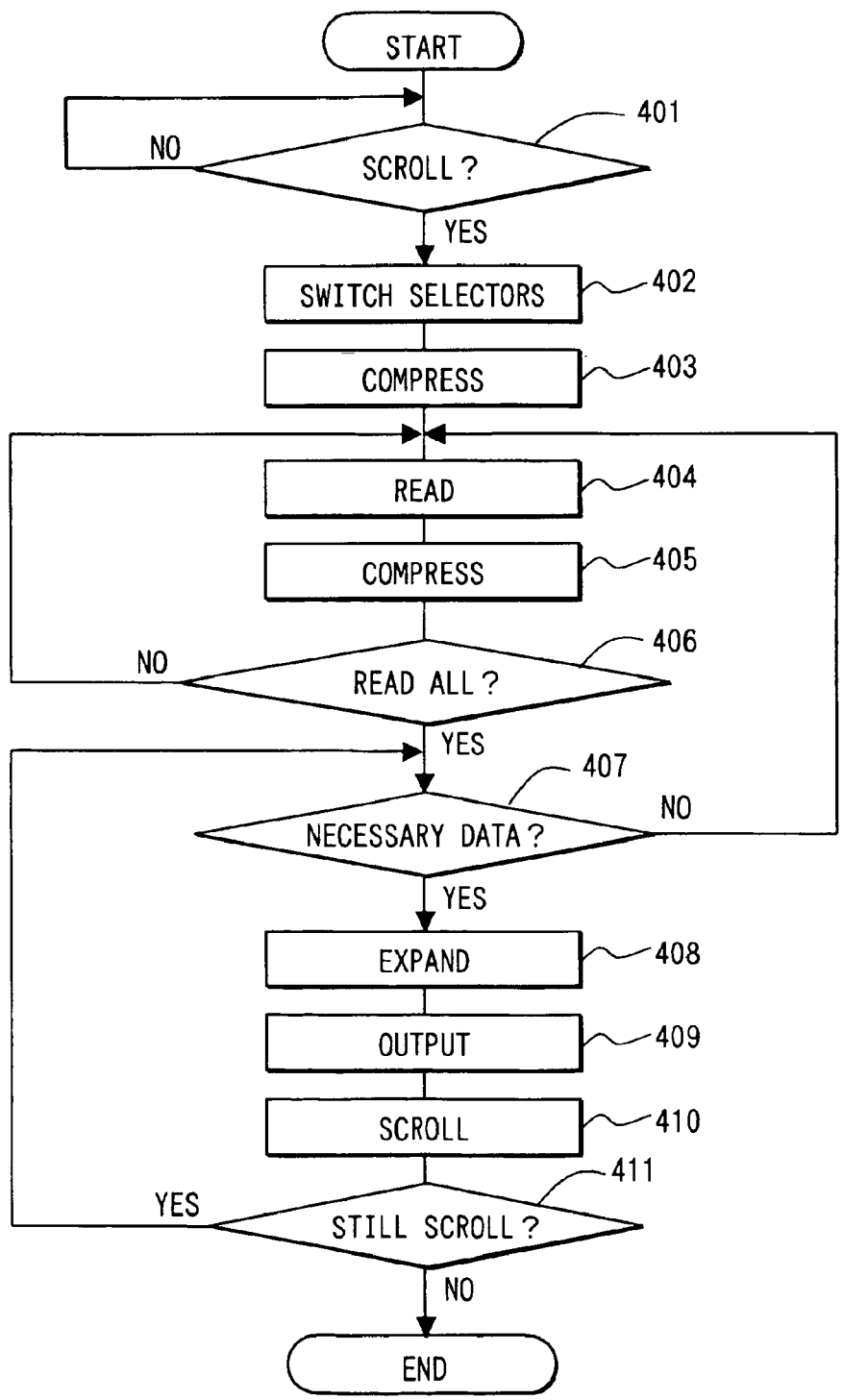
FIG. 4 is a flowchart diagram explaining processing of scrolling of an image display system according to the first embodiment.

Referring to FIG. 4, processing of scroll displaying in the image display system of the first embodiment will be explained. The processing is executed at a predetermined interval by an interrupt processing or the like.

At Step 401, whether the user pushes the scroll-direction key of the remote control 2 is determined. When the scroll-direction key is pushed, the processing proceeds to Step 402. Otherwise, the above determination is repeated till the key is pushed.

At Step 402, the selectors A1, A2, B1, and B2 of the display controller 6 are connected to the upper connection lines. The division map data inputted to the compressing section A of the display controller 6 are thereby compressed by the compressing unit 6A. The compressed data inputted to the expanding section B thereby experience expanding processing by the expanding unit 6B and the skipping unit 6C.

At Step 403, all division map data currently stored in the VRAM 7 are compressed in the compressing unit 6A. Compressing the division map data to be displayed at scrolling enables even a great amount of high-definition image to be stored in the VRAM 7. The generated compressed data are stored in the VRAM 7.

At Step 404, one division of division map data necessary for scroll displaying is read and stored in the VRAM 7. Here, the connection line between the selectors A1 and A2 is switched to the lower line. The above necessary division map data that are outputted from the ECU 5 correspond to adjacent divisions adjoining, externally towards a direction designated by the scroll-direction key, divisions displayed on the display 1.

At Step 405, the division map data read at Step 404 are compressed by the compressing unit 6A. Namely, the division map data once stored in the VRAM 7 are inputted through the selector A1 of the compressing section A to the compressing unit 6A. Compressing, every a division, the division map data necessary for scroll displaying enables a storing area of the VRAM 7 to be effectively used. Furthermore, compressing only a division located in the scrolling direction enables the storing area of the VRAM 7 to be more effectively used. The generated compressed data are thereby stored in the VRAM 7.

At Step 406, whether all necessary division map data are read is determined. When all necessary data are read, the processing proceeds to Step 407. Otherwise, the processing returns to Step 404 and continues to input the necessary division map data.

At Step 407, at starting of expanding the compressed data, whether the compressed data necessary for scroll displaying are stored in the VRAM 7 is determined. When they are stored in the VRAM 7, the processing proceeds to Step 408. Otherwise, the processing returns to Step 404 to read the necessary division map data.

At Step 408, the compressed data stored in the VRAM 7 are expanded by the expanding unit 6B. The expanded data has the same resolution as the original image data, so that it is recognizable for the user. The generated expanded data are outputted to the skipping unit 6C.

At Step 409, the unnecessary portion is skipped from the generated expanded data by the skipping unit 6C, and the necessary portion is outputted to the image signal generator 8. Outputting only the necessary portion enables processing time of the image signal generator 8 for drawing a displayed image on the display 1 to be lessened.

At Step 410, the displayed image is scrolled on the display 1.

At Step 411, whether the scroll-direction key is being pushed is determined. When the key is being pushed, the processing returns to Step 407, where the scroll displaying is continued by obtaining and expanding the compressed data. When the key is not being pushed, the processing is terminated.

As explained above, when the user pushes the scroll-direction key of the remote control 2, the image display system of the first embodiment obtains the necessary map data for scroll displaying from the map data stored in the memory 4 so as to compress and store in the VRAM 7. It then expands the stored map data to output to the image signal generator 8. This results in realizing the scroll displaying that the user easily recognizes even at high speed.

(Second Embodiment)

Figure 5:
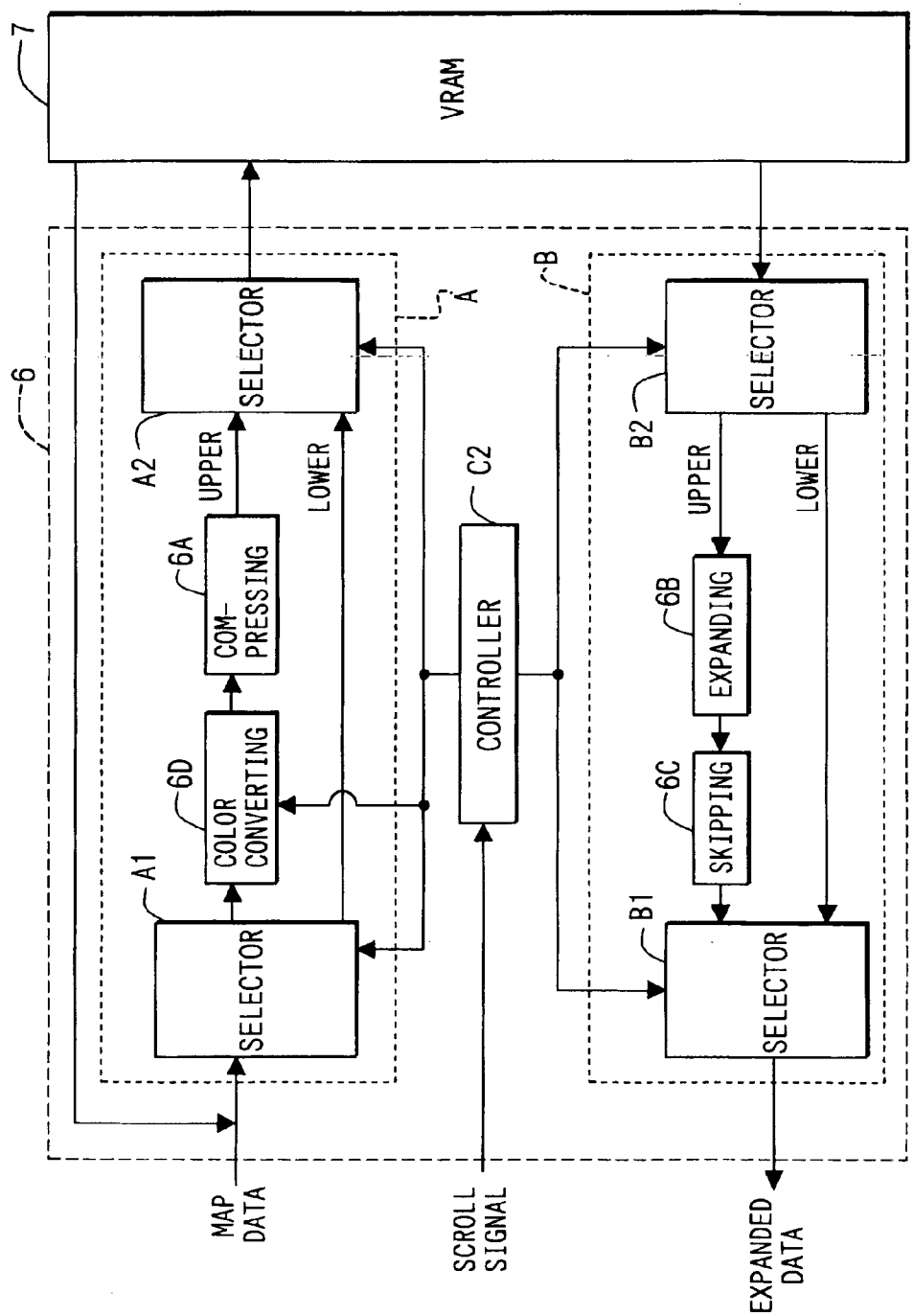
FIG. 5 is a schematic block diagram showing structure of a display controller according to a second embodiment.

As shown in FIG. 5, in a second embodiment, a color converting unit 6D is provided in the compressing section A of the display controller 6. This is different from the first embodiment.

The controller C2 outputs color-related information to the color converting units 6D along with controlling switching of selectors A1, A2, B1, and B2. The color-related information includes a color converting method of division map data, color information necessary for a case where pixel data included in the division map data are substituted, and replacement-prohibited color information that is prohibited from being replaced. These are obtained from the ECU 5 and can be set through the remote control 2 by the user.

Figure 6:
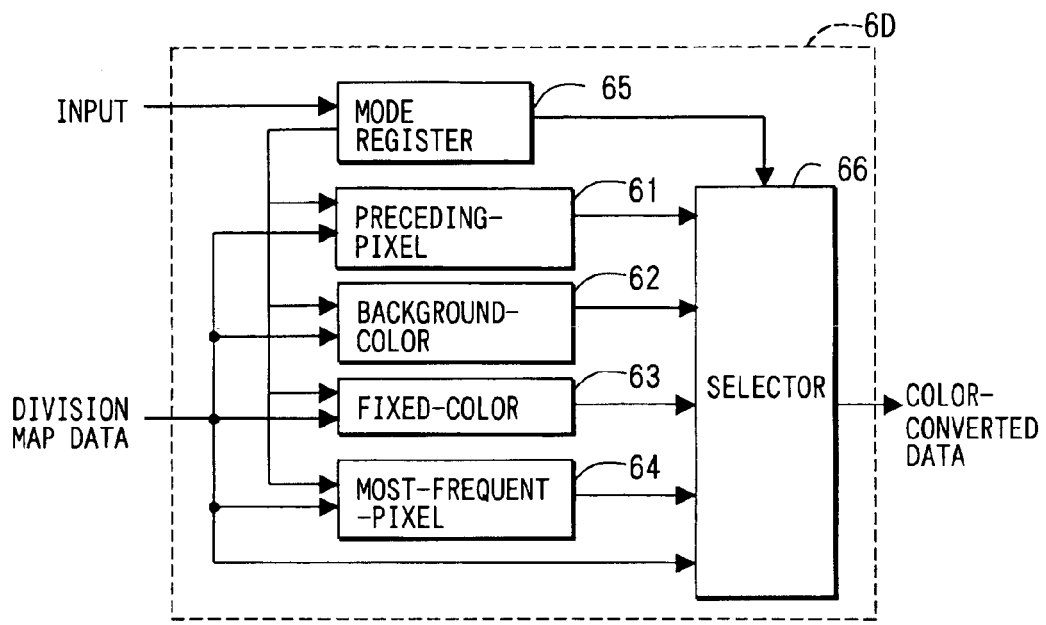
FIG. 6 is a schematic block diagram showing structure of a color converting unit according to the second embodiment.

The color converting unit 6D is formed of a plurality of parts that replaces color information of the pixels included in the division map data, as shown in FIG. 6.

A mode register 65 stores the above color-related information and controls color converting of the division map data outputted to the compressing unit 6A. The color-related information is obtained from the controller C2.

Figure 7:
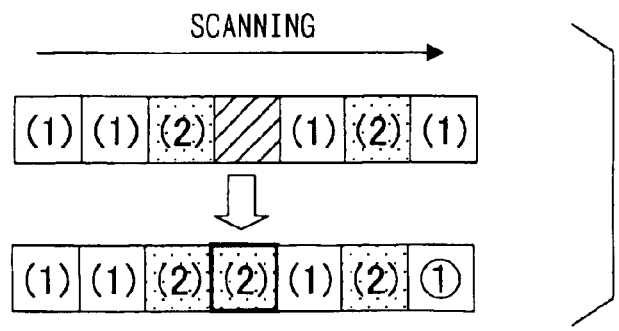
FIG. 7 is a view showing substituting by a preceding-pixel substituting part.

A preceding-pixel substituting part 61 scans in order, as shown in FIG. 7, color information of each pixel included in inputted division map data. When color information different from color information (1), (2) set by the mode register 65 is scanned, the different color information is replaced with the preceding color information (2). Here, when the different color information belongs to the above replacement-prohibited color information set by the mode register 65, the different color information is left without being replaced.

A background-color substituting part 62 replaces in order color information of each pixel included in inputted division map data with color information of a background color. Here, when the color information to be replaced belongs to the replacement-prohibited color information set by the mode register 65, the color information to be replaced is left without being replaced.

Figure 8:
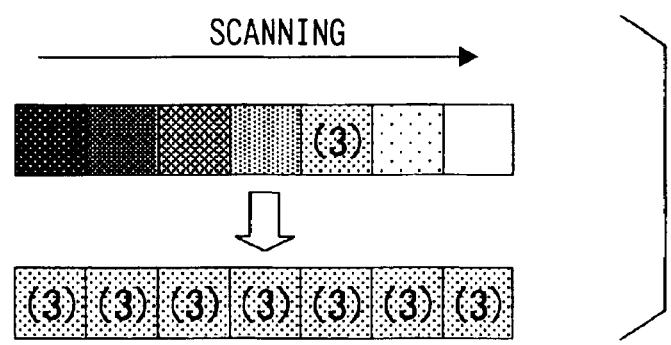
FIG. 8 is a view showing substituting by a background-color substituting part.

A fixed-color substituting part 63 scans in order, as shown in FIG. 8, color information of each pixel included in inputted division map data. When color information different from color information (3) set by the mode register 65 is scanned, the different color information is replaced with the fixed color information (3) set by the mode register 65. Here, when the different color information belongs to the replacement-prohibited color information set by the mode register 65, the different color information is left without being replaced.

Figure 9:
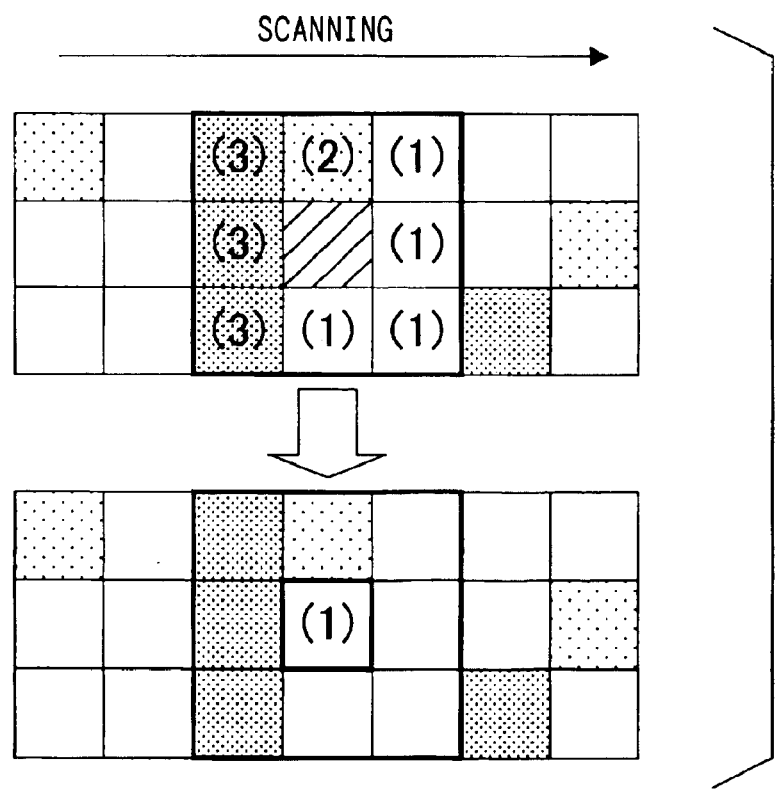
FIG. 9 is a view showing substituting by a most-frequent-pixel substituting part.

A most-frequent-pixel substituting part 64 scans in order, as shown in FIG. 9, color information of each pixel included in inputted division map data. When color information different from color information (1), (2), (3) set by the mode register 65 is scanned, the different color information is replaced with the color information (1) that is most frequently included in pixels surrounding a pixel having the different color information. Here, when the different color information belongs to the replacement-prohibited color information set by the mode register 65, the different color information is left without being replaced.

The selector 66 selects, according to instruction of the mode register 65, the color-converted division map data from one of the four substituting parts 61 to 64 to output to the subsequent compressing unit 6A.

Other structure is the same as that of the first embodiment, so that explanation is abbreviated.

Figure 10:
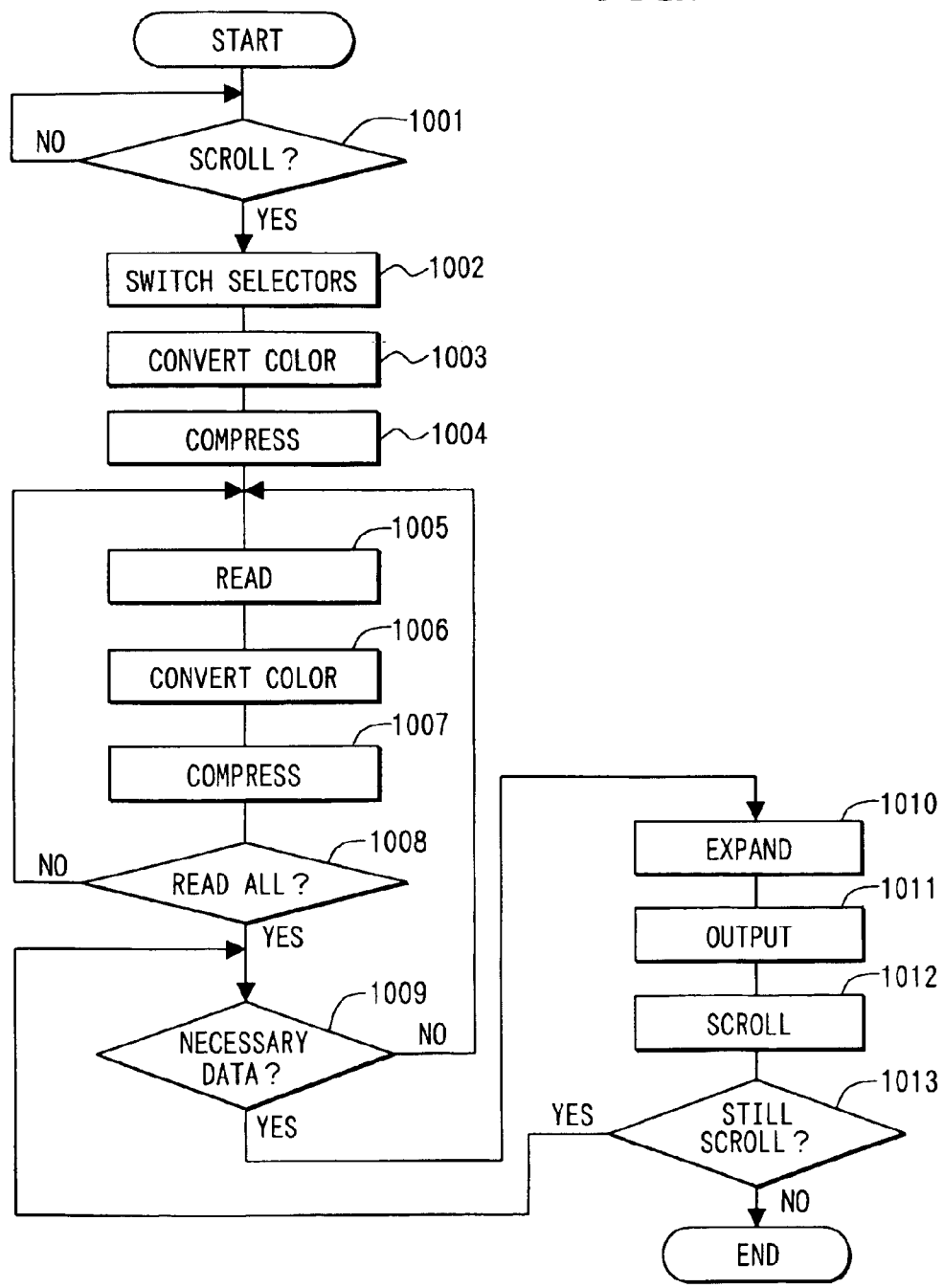
FIG. 10 is a flowchart diagram explaining processing of scrolling of an image display system according to the second embodiment.

Referring to FIG. 10, processing of scroll displaying in the image display system of the second embodiment will be explained. The processing is executed at a predetermined interval by an interrupt processing or the like.

At Step 1001, whether the user pushes the scroll-direction key of the remote control 2 is determined. When the scroll-direction key is pushed, the processing proceeds to Step 1002. Otherwise, the above determination is repeated till the key is pushed.

At Step 1002, the selectors A1, A2, B1, and B2 of the display controller 6 are connected to the upper connection lines. The division map data inputted to the compressing section A of the display controller 6 are thereby inputted to the color converting unit 6D. After experiencing color converting, the data are then compressed by the compressing unit 6A. The compressed data inputted to the expanding section B experience expanding processing by the expanding unit 6B and the skipping unit 6C.

At Step 1003, all division map data currently stored in the VRAM 7 are inputted to the color converting unit 6D to be color-converted as designated by the mode register 65. The color converting designated by the mode register 65 includes substituting of the color information of the preceding pixel, substitution of the background color information, substitution of the fixed color information designated by the user through the mode register 65, and substitution of the most-frequently existing color information in the surrounding pixels. By biasing distribution of color information included in the image information, compression rate of image data is enhanced. In detail, by substituting color information included in one of the surrounding pixels for less distributed color information, the number of pixels that have the same color information are increased, so that the compression rate can be enhanced.

In particular, by substituting the color information that is most frequently included in the surrounding pixels, the compression rate can be much enhanced. In addition to this, by substituting the color information of the background, the compression rate can be also much enhanced. Furthermore, the user can designate color information that is to be substituted. However, if color information that is to be replaced is the replacement-prohibited color information designated by the mode register 65, it must not be replaced. Pixel data including important information such as a moving route or guiding information must be maintained without being replaced. The division map data experiencing the color converting are outputted to the subsequent compressing unit 6A.

At Step 1004, the color-converted division map data are compressed in the compressing unit 6A. Compressing the division map data with converting color information results in preventing resolution of the map image from decreasing. The generated compressed data are stored in the VRAM 7.

At Step 1005, one division of division map data necessary for scroll displaying is read and stored in the VRAM 7. Here, the connection line between the selectors A1 and A2 is switched to the lower line. The above necessary division map data that are outputted from the ECU 5 correspond to adjacent divisions adjoining, externally towards a direction designated by the scroll-direction key, divisions displayed on the display 1.

At Step 1006, the division map data read at Step 1005 are inputted to the color converting unit 6D so as to be color-converted as designated by the mode register 65. The color-converted division map data are outputted to the subsequent compressing unit 6A.

At Step 1007, the division map data color-converted by the color converting unit 6D at Step 1006 are compressed by the compressing unit 6A. The generated compressed data are stored in the VRAM 7.

At Step 1008, whether all necessary division map data are read is determined. When all necessary data are read, the processing proceeds to Step 1009. Otherwise, the processing returns to Step 1005 and continues to input the necessary division map data.

At Step 1009, at starting of expanding the compressed data, whether the compressed data necessary for scroll displaying are stored in the VRAM 7 is determined. When they are stored in the VRAM 7, the processing proceeds to Step 1010. Otherwise, the processing returns to Step 1005 to read the necessary division map data.

At Step 1010, the compressed data stored in the VRAM 7 are expanded by the expanding unit 6B. The generated expanded data are outputted to the skipping unit 6C.

At Step 1011, the unnecessary portion is skipped from the generated expanded data by the skipping unit 6C, and the necessary portion is outputted to the image signal generator 8.

At Step 1012, the displayed image is scrolled on the display 1.

At Step 1013, whether the scroll-direction key is being pushed is determined. When the key is being pushed, the processing returns to Step 1009, where the scroll displaying is continued by obtaining and expanding the compressed data. When the key is not being pushed, the processing is terminated.

(Third Embodiment)

Figure 11:
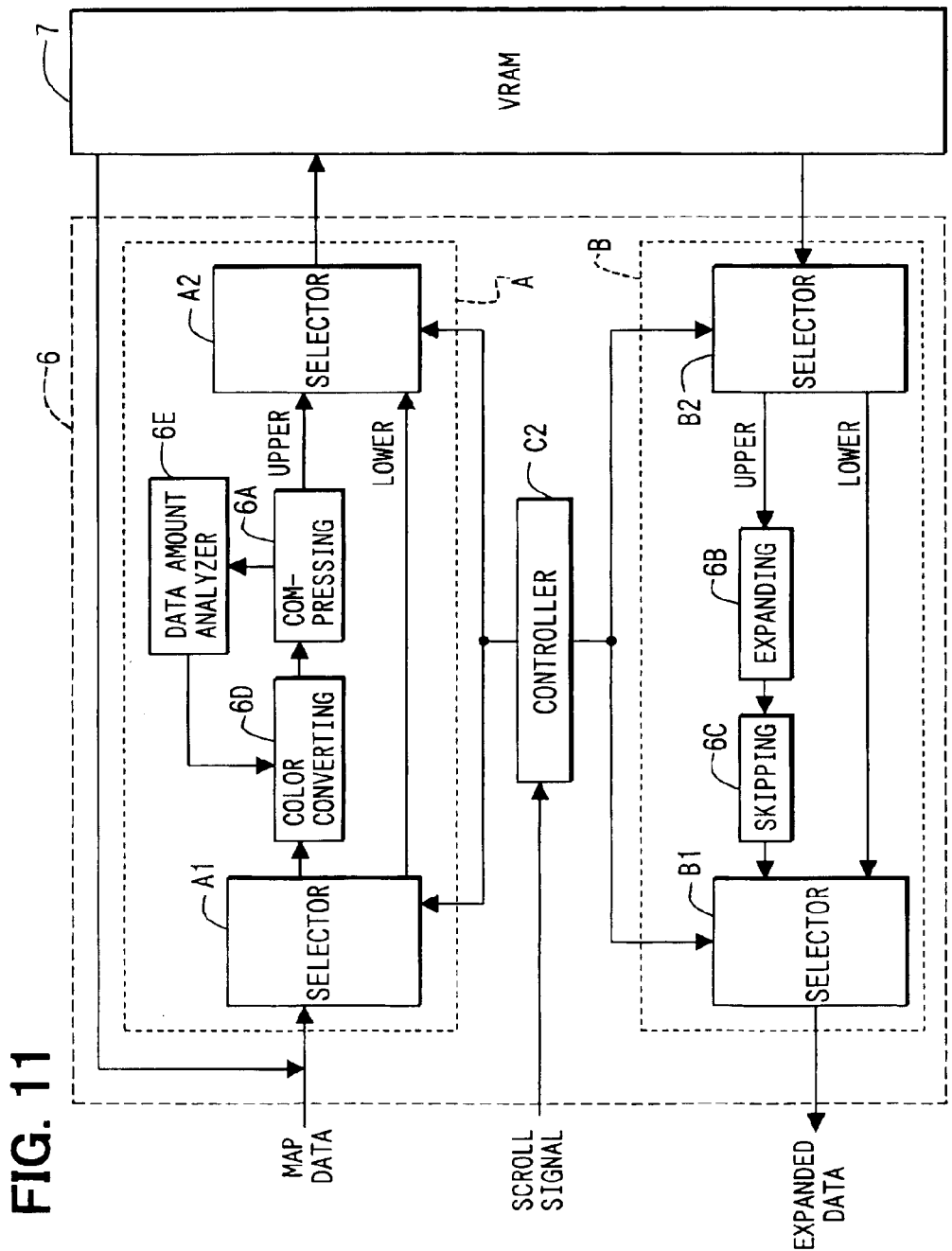
FIG. 11 is a schematic block diagram showing structure of a display controller according to a third embodiment.

As shown in FIG. 11, in a third embodiment, a data amount analyzer 6E is provided in the compressing section A of the display controller 6. This is different from the second embodiment.

The data amount analyzer 6E compares, with a predetermined data amount, a data amount of certain compressed data generated by the compressing unit 6A. Here, the certain compressed data are generated by compressing certain division map data. When the data amount of the certain compressed data is more than the predetermined data amount, the data amount analyzer 6E commands the color converting unit 6D to output another color-converted division map data to the compressing unit 6A. Here, the another color-converted division map data include color information whose data amount is not more than that of the color information of the above certain division map data. Other structure of the third embodiment is similar to that of the first or second embodiment, so that explanation of the structure is abbreviated.

Figure 12:
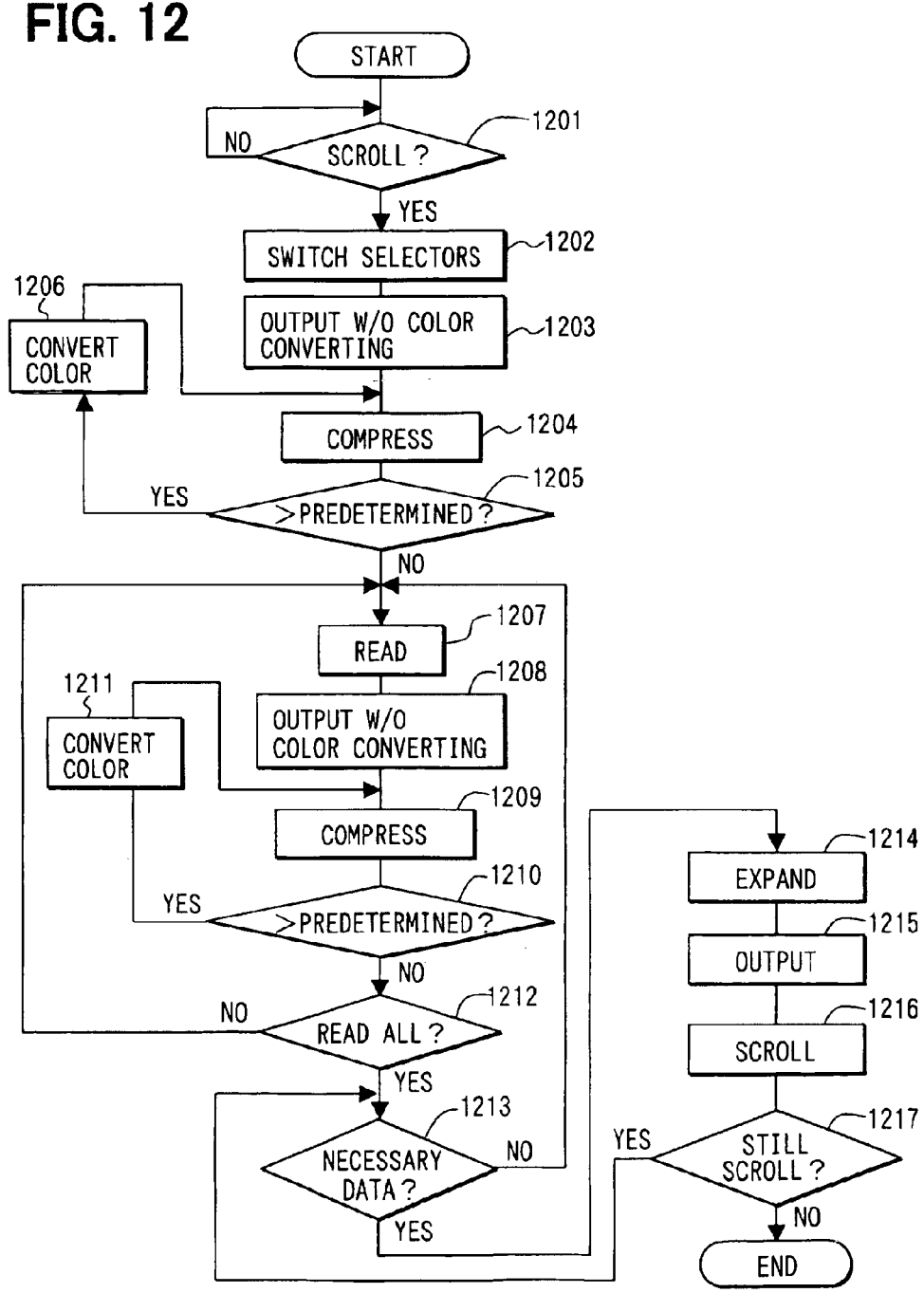
FIG. 12 is a flowchart diagram explaining processing of scrolling of an image display system according to the third embodiment.
Figure 13:
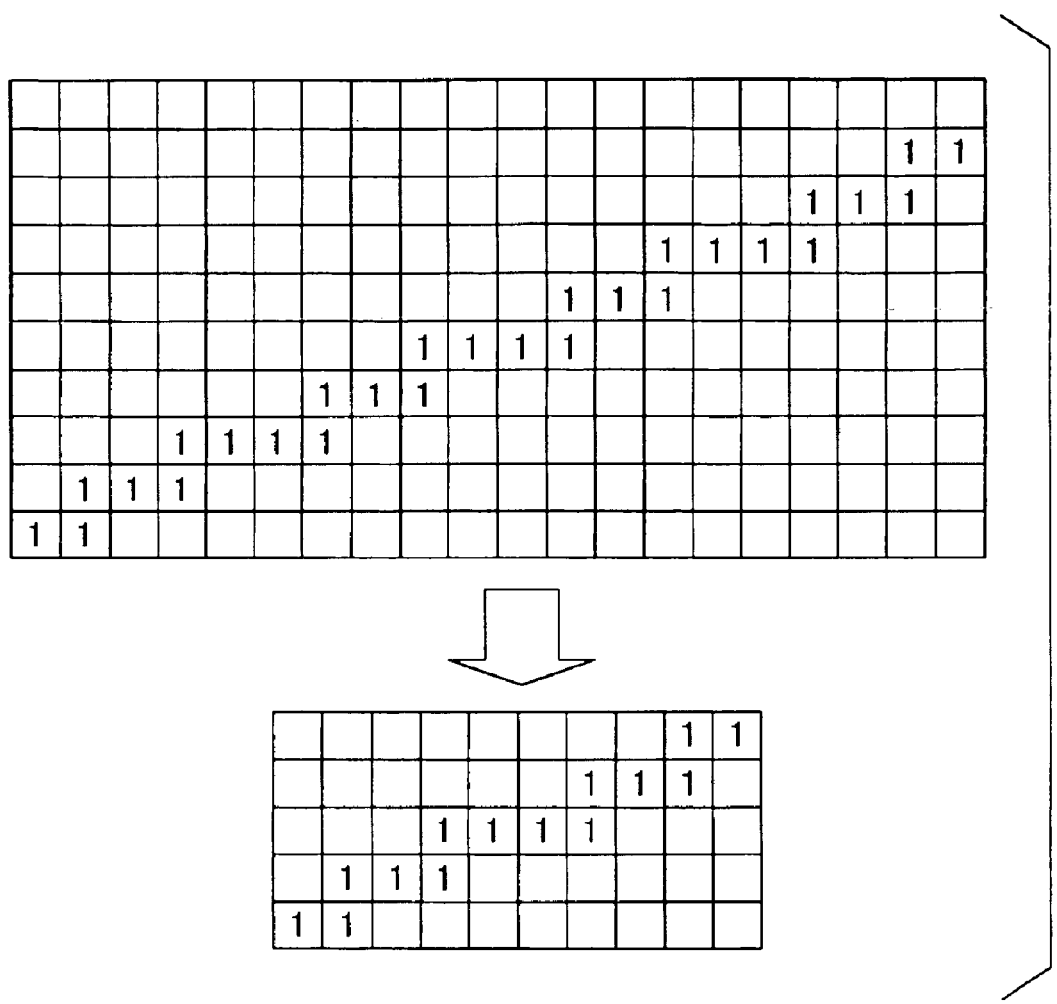
FIG. 13 is a view showing thinning image elements in high-speed scrolling of a related art.

Referring to FIG. 12, processing of scroll displaying in the image display system of the third embodiment will be explained. The processing is executed at a predetermined interval by an interrupt processing or the like.

At Step 1201, whether the user pushes the scroll-direction key of the remote control 2 is determined. When the scroll-direction key is pushed, the processing proceeds to Step 1202. Otherwise, the above determination is repeated till the key is pushed.

At Step 1202, the selectors A1, A2, B1, and B2 of the display controller 6 are connected to the upper connection lines. The division map data inputted to the compressing section A of the display controller 6 are thereby inputted to the color converting unit 6D. After experiencing color converting, the data are then compressed by the compressing unit 6A. The compressed data inputted to the expanding section B experience expanding processing by the expanding unit 6B and the skipping unit 6C.

At Step 1203, all division map data currently stored in the VRAM 7 are inputted to the color converting unit 6D and then outputted to the subsequent compressing unit 6A without being color-converted.

At Step 1204, the division map data outputted from the color converting unit 6D at Step 1203 are compressed by the compressing unit 6A. Here, compressed data are generated as a group.

At Step 1205, whether a data amount of the generated group of compressed data is more than the predetermined data amount is determined. The predetermined data amount is a quotient that is obtained by dividing a storing area for groups of compressed data in the VRAM 7 by the number of the groups of compressed data necessary for scroll displaying, and the maximum data amount that one group of compressed data is allowed to have. Thus, when a given group of compressed data has more than the predetermined data amount, the color converting unit 6D is required to output, to the compressing unit 6A, division map data whose color information is decreased from that of the given group of compressed data. This enables the compressed data to be maintained not more than the predetermined data amount, so that the storing area of the VRAM 7 can be effectively used. When the compressed data are not more than the predetermined data amount, the compressed data are stored in the VRAM 7 and the processing proceeds to Step 1207. Otherwise, the processing proceeds to Step 1206. Here, as explained above, the color converting unit 6D is required to output, to the compressing unit 6A, division map data whose color information is decreased by being color-converted. The determination at Step 1205 is then repeated.

At Step 1207, one division of division map data necessary for scroll displaying is read and stored in the VRAM 7. The above necessary division map data that are outputted from the ECU 5 correspond to adjacent divisions adjoining, externally towards a direction designated by the scroll-direction key, divisions displayed on the display 1.

At Step 1208, the division map data read at Step 1207 are inputted to the color converting unit 6D and then outputted to the compressing unit 6A without being color-converted.

At Step 1209, the division map data outputted from the color converting unit 6D at Step 1208 are compressed by the compressing unit 6A. Here, compressed data are generated as a group.

At Step 1210, whether a data amount of the generated group of compressed data is more than the predetermined data amount is determined. When the compressed data are not more than the predetermined data amount, the compressed data are stored in the VRAM 7 and the processing proceeds to Step 1212. Otherwise, the processing proceeds to Step 1211. Here, similarly in Step 1205, the color converting unit 6D is required to output, to the compressing unit 6A, division map data whose color information is decreased by being color-converted. The determination at Step 1210 is then repeated.

At Step 1212, whether all necessary division map data are read is determined. When all necessary data are read, the processing proceeds to Step 1213. Otherwise, the processing returns to Step 1207 and continues to input the necessary division map data.

At Step 1213, at starting of expanding the compressed data, whether the compressed data necessary for scroll displaying are stored in the VRAM 7. When they are stored in the VRAM 7, the processing proceeds to Step 1214. Otherwise, the processing returns to Step 1207 to read the necessary division map data.

At Step 1214, the compressed data stored in the VRAM 7 are expanded by the expanding unit 6B. The generated expanded data are outputted to the skipping unit 6C.

At Step 1215, the unnecessary portion is skipped from the generated expanded data by the skipping unit 6C, and the necessary portion is outputted to the image signal generator 8.

At Step 1216, the displayed image is scrolled on the display 1.

At Step 1217, whether the scroll-direction key is being pushed is determined. When the key is being pushed, the processing returns to Step 1213, where the scroll displaying is continued by obtaining and expanding the compressed data. When the key is not being pushed, the processing is terminated.

The image display system of the present invention can be suitably directed to a car navigation system that has a map scrolling function and cannot properly decrease data amount even though data compression is executed.

What is claimed is:

1. An image display system comprising:

first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second storing means to generate expanded data; and image displaying means for displaying, by using the expanded data, the displayed image at scrolling, wherein the second storing means further stores the given portion of the image data that is not compressed by the compressing means, and wherein the compressing means retrieves the given portion of the image data that is not compressed from the second storing means and then compresses the given portion of the image data when the start of scrolling the displayed image is commanded by the commanding means.

2. An image display system comprising:

first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second storing means to generate expanded data;

image displaying means for displaying, by using the expanded data, the displayed image at scrolling; and direction designating means for designating a direction of scrolling, wherein the compressing means compresses the given portion of the image data including the image data that is to be displayed when the displayed image is scrolled towards the direction designated by the direction designating means.

3. An image display system comprising:

first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second storing means to generate expanded data;

image displaying means for displaying, by using the expanded data, the displayed image at scrolling; and measuring means for measuring a data amount of the compressed data generated by the compressing means, wherein the compressing means is capable of switching a plurality of compressing methods that have respective compression rates to generate the compressed data, wherein the compressing means compresses certain image data to generate first compressed data by using a first compressing method, and wherein, when a data amount of the first compressed data that is measured by the measuring means is more than a predetermined data amount, the compressing means compresses the certain image data by using a second compressing method to generate second compressed data, wherein the second compressed data is smaller than the first compressed data.

4. An image display system comprising:

first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second storing means to generate expanded data;

image displaying means for displaying, by using the expanded data, the displayed image at scrolling, wherein the compressing means includes biasing means for biasing distribution of color information included in the image data, and wherein the compressing means nonreversibly compresses the given portion of the image data through biasing the distribution of the color information included in the given portion of the image data by the biasing means.

5. An image display system comprising first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second storing means to generate expanded data;

image displaying means for displaying, by using the expanded data, the displayed image at scrolling, wherein the image data includes pieces of color information, each of the pieces of the color information being included in pixel information that is possessed by each of a plurality of pixels, wherein the compressing means compresses the given portion of the image data nonreversibly by substituting another piece of the color information for a certain piece of the color information of a certain pixel included in the image data, wherein the substituted another piece of the color information is included in one of pixels adjoining the certain pixel, and wherein the substituted another piece of the color information is most frequently included in the pixels adjoining the certain pixel.

6. An image display system according to claim 7, further comprising:

first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second storing means to generate expanded data;

image displaying means for displaying, by using the expanded data, the displayed image at scrolling, wherein the image data include pieces of color information, each of the pieces of the color information being included in pixel information that is possessed by each of a plurality of pixels, wherein the compressing means compresses the given portion of the image data nonreversibly by substituting another piece of the color information for a certain piece of the color information of a certain pixel included in the image data, color information setting means for setting the color information of any one of the pixels, wherein the substituted another piece of the color information is set by the color information setting means, and wherein the color information set by the color information setting means is color information of a background of the displayed image.

7. An image display system comprising:

first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second staring means to generate expanded data;

image displaying means for displaying, by using the expanded data, the displayed image at scrolling, wherein the image data includes pieces of color information, each of the pieces of the color information being included in pixel information that is possessed by each of a plurality of pixels, wherein the compressing means compresses the given portion of the image data nonreversibly by substituting another piece of the color information for a certain piece of the color information of a certain pixel included in the image data, prohibiting means for setting prohibited color information that is prohibited from being replaced with the substituted another piece of the color information, wherein, when the certain piece of the color information is the prohibited color information, the compressing means compresses the given portion of the image data without substituting another piece of the color information for the certain piece of the color information of the certain pixel included in the image data.

8. An image display system comprising:

first storing means for storing image data;

commanding means for commanding a start of scrolling a displayed image on a display;

compressing means for retrieving a given portion of the image data from the first storing means when the start of scrolling the displayed image is commanded by the commanding means, and then compressing the given portion of the image data to generate compressed data, wherein the given portion of the image data includes the image data that is to be displayed at scrolling;

second storing means for storing the compressed data;

expanding means for expanding the compressed data stored in the second storing means to generate expanded data;

image displaying means for displaying, by using the expanded data, the displayed image at scrolling, wherein the image data include pieces of color information, each of the pieces of the color information being included in pixel information that is possessed by each of a plurality of pixels, wherein the compressing means compresses the given portion of the image data nonreversibly by substituting another piece of the color information for a certain piece of the color information of a certain pixel included in the image data, and wherein the substituted another piece of the color information is included in one of pixels adjoining the certain pixel.

9. An image display system comprising:

first storing means for storing image data;

commanding means for commanding a start of scrolling a displayed image on a display;

compressing means for retrieving a given protion of the image data from the first storing means when the start of scrolling the displayed image is commanded by the commanding means, and then compressing the given protion of the image data to generate compressed data, wherein the given portion of the image data includes the image data that is to be displayed at scrolling;

second storing means for storing the compressed data;

expanding means for expanding the compressed data stored in the second storing means to generate expanded data;

image displaying means for displaying, by using the expanded data, the displayed image at scrolling, wherein the image data includes pieces of color information, each of the pieces of the color information being included in pixel information that is possessed by each of a plurality of pixels, wherein the compressing means compresses the given portion of the image data nonreversibly by substituting another piece of the color information for a certain piece of the color information of a certain pixel included in the image data, and color information setting means for setting the color information of any one of the pixels, wherein the substituted another piece of the color information is set by the color information setting means.

* * * * *